No. 787,315. PATENTED APR. 11, 1905.
A. TARRIS.
SWINGING GATE.
APPLICATION FILED MAR. 29, 1904.
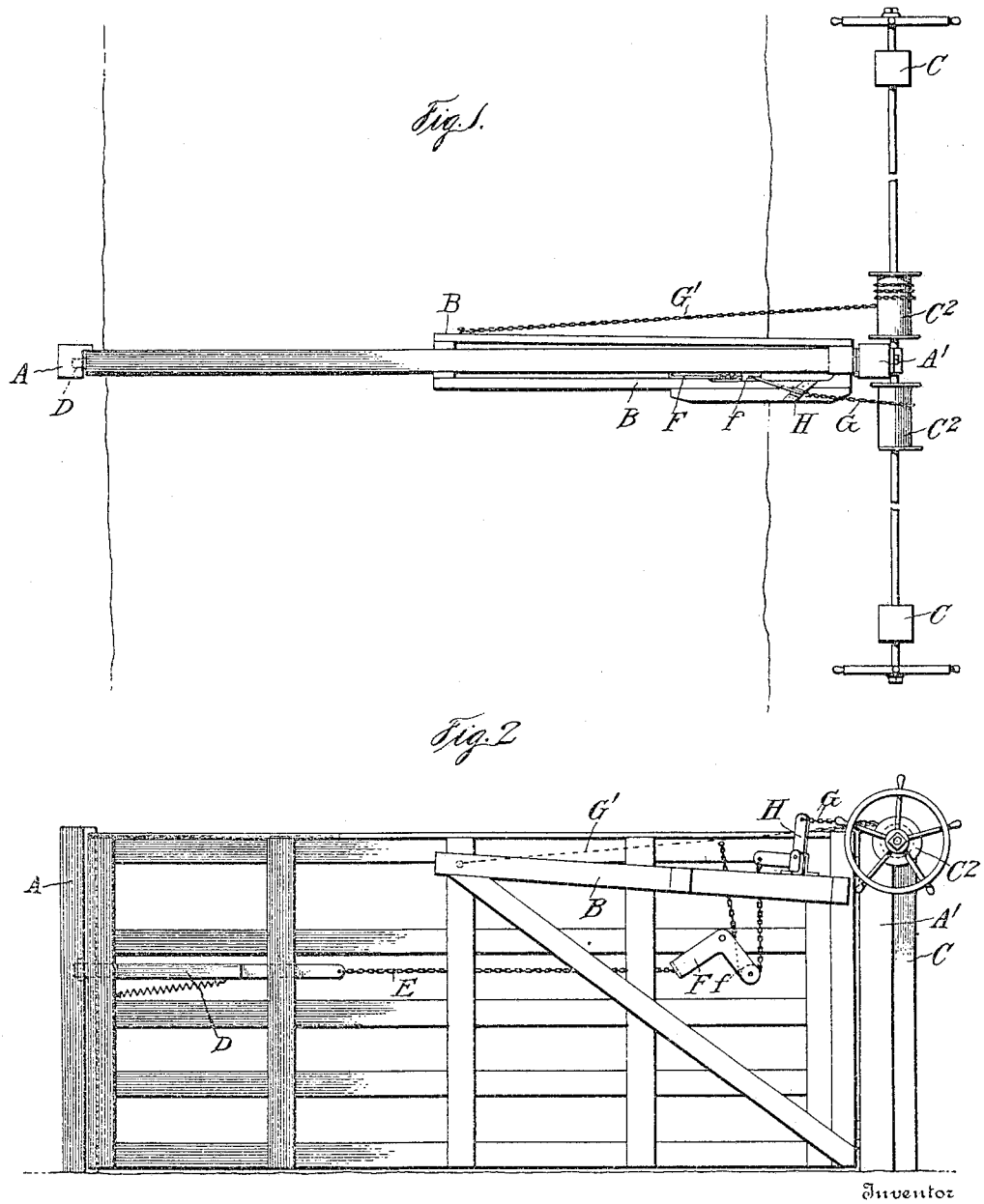

No. 787,315.

Patented April 11, 1905.

UNITED STATES PATENT OFFICE.

ANDREW TARRIS, OF MARION, INDIANA, ASSIGNOR OF ONE-HALF TO EDWIN M. BOCOCK, OF MARION, INDIANA.

SWINGING GATE.

SPECIFICATION forming part of Letters Patent No. 787,315, dated April 11, 1905.

Application filed March 29, 1904. Serial No. 200,547.

*To all whom it may concern:*

Be it known that I, ANDREW TARRIS, a citizen of the United States, residing at Marion, in the county of Grant and State of Indiana, have invented new and useful Improvements in Swinging Gates, of which the following is a specification.

The invention consists in the particular means which I employ to open and shut a gate.

Figure 1 of the drawings is a plan view which shows the position of all parts of the mechanism which opens and shuts the gate, and Fig. 2 a detail elevation which shows the latch and the mechanism by which it is operated.

In the drawings, A A' represent the posts, to one of which the gate is hinged, while to the other it is latched. The latch-post A is provided on its inner face with a hole to receive the latch and has a beveled corner which allows the latch to slip by and be thrown by its spring into the hole. About this there is of course nothing new.

B B are braces on the rear of gate, and C C bearing-posts for a rotary shaft C', which carries windlasses C², extending equally, or nearly so, on each side of the hinge-post A'.

D is the slide-latch, whose rear end connects by a chain E with an elbow-lever F, which is fulcrumed on the second rail of gate from the top. On the other end of this lever may be a pulley *f*, around which passes the loop of a chain fastened at one end to the top rail and at the other to an elbow-lever H. The latter is connected at the end of its rear arm by a chain G with a windlass C². On the opposite side of gate is secured one end of a chain G', which also connects with a windlass C².

By giving a rotation to the windlass in one direction the gate is unlatched and thrown open, while by rotating it in an opposite direction the gate is closed and latched by its spring.

It will be observed that the chains G G' pass around the opposite sides of the windlass and in opposite directions, so that when one is wound up the other is unwound.

I am aware that a turn-shaft is described in American Patent No. 583,978 and shown in connection with a swinging gate; but it is connected therewith by a middle post, a strap, a cam, and a sliding yoke, which I dispense with entirely.

Hence what I claim as new, and desire to protect by Letters Patent, is—

A swinging gate having a sliding latch, in combination with a turn-shaft approximately on a level, with the top rail, at right angles thereto, and having a windlass C² on each side of gate, one windlass connecting with the latch mechanism and the other with a point about midway of the gate as shown and described, for the purpose set forth.

In testimony whereof I have signed my name to this specification in the presence of two subscribing witnesses.

ANDREW TARRIS.

Witnesses:
JOSHUA T. SAILAS,
LEWIS E. RINEHART.